(No Model.)

J. K. PURINTON.
DISH CLEANER.

No. 506,726. Patented Oct. 17, 1893.

Witnesses:
W. J. Saukey.
J. Ralph Orwig.

Inventor: Judson K. Purinton,
By Thomas & Orwig. Attorney.

UNITED STATES PATENT OFFICE.

JUDSON K. PURINTON, OF DES MOINES, IOWA.

DISH-CLEANER.

SPECIFICATION forming part of Letters Patent No. 506,726, dated October 17, 1893.

Application filed January 21, 1893. Serial No. 459,094. (No model.)

*To all whom it may concern:*

Be it known that I, JUDSON K. PURINTON, a citizen of the United States of America, residing at Des Moines, in the county of Polk and State of Iowa, have invented a Dish-Washer, of which the following is a specification.

The object of my invention is to provide a cheap, simple and durable device in which soiled dishes, &c., may be placed in the proper position, and securely held while being manually moved in a vertical plane through a vessel containing hot water.

To this end my invention consists in the construction, arrangement and combination of the various parts of the device as hereinafter fully set forth, pointed out in my claims and illustrated in the accompanying drawings, in which—

Figure 1:
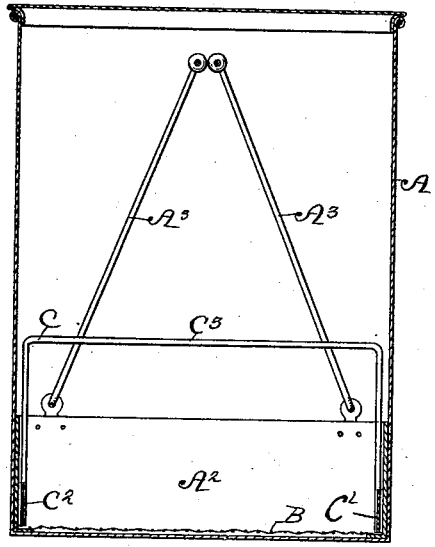
Figure 3:
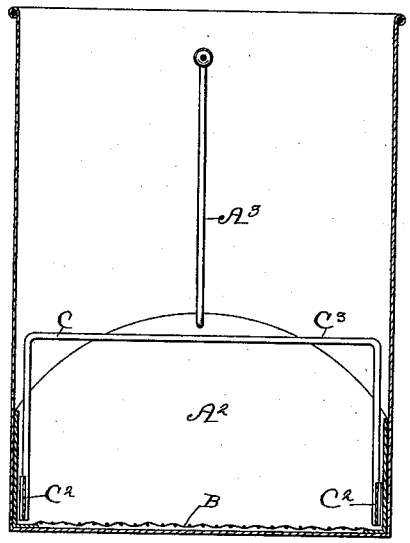
Figure 2:
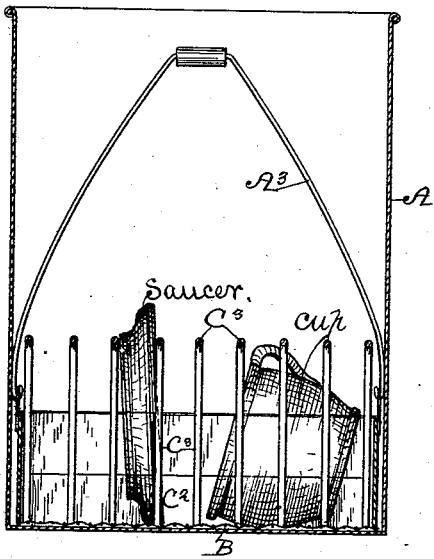
Figure 4:
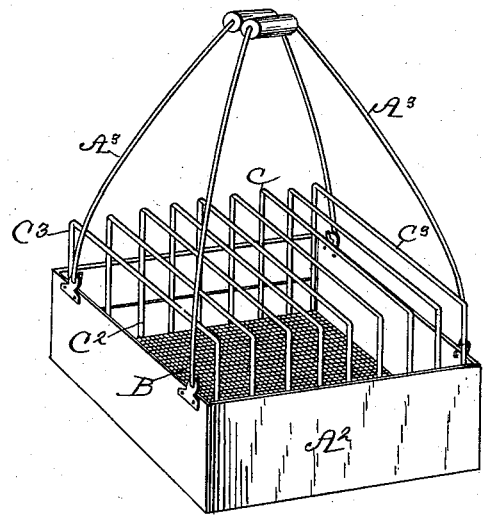

Figure 1 is a vertical sectional view through the complete device. Fig. 2 is a vertical sectional view of the same at right angles to the view shown in Fig. 1. Fig. 3 is a vertical sectional view of a modified form of the device, and Fig. 4 is a perspective view of the dish holding device.

Referring to the accompanying drawings the reference letter A is used to designate a water tight vessel approximately square in horizontal section and of a comparatively great height.

$A^2$ designates a rectangular frame open at its top and bottom and of a size and shape adapted to be moved vertically within the vessel A.

$A^3$ are bails pivotally attached to the end portions of the frame $A^2$ and adapted to meet above the said frame.

B designates a wire netting or perforated bottom permanently fixed in the frame $A^2$ to form a bottom therefor and to produce a tray adapted to retain and carry and drain dishes.

C designates a cover for the tray $A^2$ composed of the two pieces $C^2$ and the metal spring rods $C^3$ which are secured to said end pieces extended straight upwardly therefrom, and across the top of the frame, thus forming a device which may readily be detached from the tray $A^2$ and so arranged that plates, saucers, and like dishes may be placed between the rods $C^3$ of the cover C and be held in a vertical position so as to be the more readily cleaned.

In the modification shown in Fig. 3 only one bail is used which is attached to the central portion of the frame.

In the practical operation of the device, the vessel A is first filled with hot water, some of the soiled dishes placed in the tray $A^2$ and the spring cover C fixed in it and then such dishes as may be slipped between the rods $C^3$ are placed in the vessel A and moved vertically therein by means of the bails $A^3$, thus causing the water to come in forcible contact with the dishes contained therein. The elasticity of the spring rods $C^3$ allows the cover to expand and engage the tray.

Having thus described my invention, what I claim as new, and desire to secure by Letters Patent of the United States therefor, is—

1. An improved dish washing machine comprising a suitable open-topped water-tight vessel, a frame or tray open at its top and provided with a perforated bottom and adapted to slide within the vessel in a vertical plane, a detachable and vertically adjustable cover for the frame composed of spring rods attached to side plates and extending across the frame with spaces between them, and means whereby the tray may be operated in a vertical plane.

2. An improved dish washing machine comprising a suitable water vessel A, a frame $A^2$ open at its top and bottom and adapted to slide within the vessel A in a vertical plane, a perforated bottom in said frame, a detachable cover C for the frame $A^2$ composed of rods attached to side plates and extending across the frame with spaces between them, as set forth, and two bails attached to the ends of the frame $A^2$ to meet above said frame for the purposes stated.

JUDSON K. PURINTON.

Witnesses:
R. H. ORWIG,
THOMAS G. ORWIG.